(12) United States Patent
Wu (10) Patent No.: US 8,599,567 B2
(45) Date of Patent: Dec. 3, 2013

(54) ELECTRONIC MODULE WITH IMPROVED PRINTED CIRCUIT BOARD TO MAXIMIZE WIDTH THEREOF

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 201 days.

(21) Appl. No.: 13/155,405

(22) Filed: Jun. 8, 2011

(65) Prior Publication Data

US 2011/0304996 A1    Dec. 15, 2011

(30) Foreign Application Priority Data

Jun. 10, 2010   (CN) .................... 2010 2 0221866 U (51) Int. Cl.
*H05K 5/00* (2006.01)

(52) U.S. Cl.
USPC ........... 361/752; 361/756; 361/796; 361/807; 439/157

(58) Field of Classification Search
USPC ................................. 361/752, 756, 796, 807
See application file for complete search history.

(56) References Cited

U.S. PATENT DOCUMENTS

| | | | |
|---|---|---|---|
| 5,163,847 A * | 11/1992 | Regnier | 439/157 |
| 5,801,928 A * | 9/1998 | Burstedt et al. | 361/801 |
| 6,350,063 B1 * | 2/2002 | Gilliland et al. | 385/88 |
| 6,530,785 B1 * | 3/2003 | Hwang | 439/76.1 |
| 6,633,420 B2 | 10/2003 | Huang | |
| 6,840,680 B1 * | 1/2005 | Chiu et al. | 385/53 |
| 7,090,527 B2 * | 8/2006 | Hanley et al. | 439/372 |
| 7,402,070 B1 * | 7/2008 | Wu | 439/352 |
| 7,566,246 B2 * | 7/2009 | Moore et al. | 439/607.01 |
| 7,680,389 B2 * | 3/2010 | Shaw et al. | 385/139 |
| 7,690,939 B2 * | 4/2010 | Wu | 439/352 |
| 7,798,843 B1 * | 9/2010 | Wu | 439/455 |
| 2004/0067680 A1 * | 4/2004 | Wu | 439/497 |
| 2004/0067681 A1 * | 4/2004 | Wu | 439/497 |
| 2005/0287838 A1 * | 12/2005 | Boudreau et al. | 439/74 |
| 2009/0147493 A1 * | 6/2009 | Wu | 361/818 |
| 2009/0156058 A1 * | 6/2009 | Wu | 439/607.18 |
| 2010/0029095 A1 * | 2/2010 | Wu | 439/31 |
| 2010/0091466 A1 * | 4/2010 | Wu | 361/747 |
| 2010/0091467 A1 * | 4/2010 | Wu | 361/747 |
| 2011/0195614 A1 * | 8/2011 | Wu | 439/676 |
| 2011/0281455 A1 * | 11/2011 | Wu | 439/345 |

* cited by examiner

*Primary Examiner* — Adrian S Wilson
*Assistant Examiner* — Abhishek Rathod
(74) *Attorney, Agent, or Firm* — Wei Te Chung; Ming Chieh Chang (57) ABSTRACT

An electronic module (100) comprises a base portion (1), a panel portion (2) defining a pair of flange members (211, 212), a printed circuit board (3) and an actuator mechanism assembled to the base portion. The base portion defines a pair of lateral walls (111, 112), the pair of flange members are located inside of the corresponding lateral walls. The printed circuit board has a pair of positioning holes (32), and the base portion defines a plurality of standoffs (1112, 1113), and at least one of the standoffs (1113) on a same side has a situating post (1114) thereon, with the situating posts (1114) inserted into the relative positioning holes (32).

18 Claims, 8 Drawing Sheets

ELECTRONIC MODULE WITH IMPROVED PRINTED CIRCUIT BOARD TO MAXIMIZE WIDTH THEREOF

BACKGROUND OF THE INVENTION

1. Field of the Invention

The present invention generally relates to an electronic module, and more particularly to an electronic module having an improved printed circuit board for high speed signal transmitting.

2. Description of Related Art

SFP (Small Form-factor Pluggable), X-SFP and QSFP are all modules for fiber optic transmission or ordinary signal transmission. All of the modules are of small size or form factor which is important. The smaller the form factor of the module, the less space taken on a printed circuit board to which it couples. A smaller form factor allows a greater number of modules to be coupled onto a printed circuit board to support additional communication channels. However, the electronic module with smaller form factor makes a printed circuit board more smaller therein, and the printed circuit board is always mounting in a housing of the electronic module via a plurality of through holes.

U.S. Pat. No. 6,633,420B2 discloses an electronic module having a printed circuit board therein, and the printed circuit board defines a pair of mounting holes, and a pair of screws are inserted into the mounting holes and openings arranged in a housing of the electronic module, therefore the usable area of the printed circuit board may be smaller for electrical components arrangement.

Hence, an improved electronic module is highly desired to overcome the disadvantages of the related art.

SUMMARY OF THE INVENTION

Accordingly, an object of the present invention is to provide an electronic module having an improved printed circuit board to maximize a usable width thereof In order to achieve the object set forth, an electronic module comprising a base portion having a receiving space, a panel portion defining a pair of flange members, a printed circuit board disposed in the base portion and an actuator mechanism assembled to the base portion. The base portion defines a pair of lateral walls parallel to each other, the pair of flange members are located inside of the corresponding lateral walls. The printed circuit board has a pair of positioning holes on lateral sides thereof, and the base portion defines a plurality of standoffs neighboring to the corresponding lateral walls, and at least one of the standoffs on a same side has a situating post thereon, the standoffs are adjacent to a bottom surface of the printed circuit board, with the situating posts inserted into the relative positioning holes, the panel portion has a plurality of supporting posts on the flange members to be adjacent to a top surface of the printed circuit board.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Referring to FIGS. 1-8, the electronic module 100 comprises a housing (not numbered) composed of a conductive base portion 1 and a conductive panel portion 2, a printed circuit board 3, a cable 4, a metallic gasket 5 and an actuator mechanism (not numbered).

Referring to FIGS. 1-5, the base portion 1 is die-cast or other metallic plated body, and includes a primary body portion 11 and a first mounting portion 12 rearward extending from back face of the primary body portion 11. The primary body portion 11 has a pair of lateral walls 111, 112 and a bottom wall 113 joining to lower sections of the lateral walls 111, 112 to from a receiving space 110 with an upper window (not numbered). Rear sections of the pair of the lateral walls 111, 112 define a pair of first depression portions 1110. A front section of the bottom wall 113 is cut to form an outlet 1131. A rear section of the bottom wall 113 defines a first channel 1132 located in a middle area thereof, with a tab 1133 formed in the front and middle of the first channel 1132. An extrusion 1138 is defined in the first channel 1132 and located behind the tab 1133. A pair of sunken portions 1134 are defined in two lateral areas of the rear section of the bottom wall 113, and arranged at outward of the first channel 1132. A pair of indentations 1135 are arranged at inward of the corresponding sunken portions 1134, and the indentations 1135 are deeper than the sunken portions 1134. A pair of protrusions 1136 are respectively formed in a rear corners (not numbered) of the sunken portions 1134, a pair of tiny posts 1137 respectively are formed in the middle area of the pair of indentations 1135, and a pair of protrusion members 1136 are respectively formed in a central of the indentations 1135. The primary body portion 11 further has a beam portion 114 with substantially L-shaped cross-section interconnecting distal portions of the pair of the lateral walls 111, 112.

The lateral walls 111, 112 of the primary body portion 11 respectively has a plurality of first standoffs 1112 and a second standoff 1113 in front of the first standoffs 1112 adjacent to inner sides thereof The first standoffs 1112 and the second standoff 1113 are neighboring to the outlet 1131 of the primary body portion 11, and a wider rib 1115 is disposed in front of each second standoff 1113. Each second standoff 1113 has a situating post 1114 on a top surface thereof, the situating post 1114 on the lateral wall 111 and the situating post 1114 of the lateral wall 112 are stagger along a transverse direction.

The first mounting portion 12 has a pair of side walls 121 and a lower wall 122 to corporately form a first semi-circular cavity 1201, and a deeper first position slot 1202 is located in front of the first semi-circular cavity 1201. A second channel 1221 is defined in a middle area of the lower wall 122 and communicated with the first channel 1132 of the primary body portion 11. A pair of guiding members 123 are respectively formed on lateral areas of the lower wall 122. Each guiding member 123 has a thin bar member 1231 formed on a back section of an interior surface thereof and a lengthways guiding passage 1232 in front of the bar member 1231. A pair of pivot members 1211 are respectively formed on upper sections of exterior surfaces of the pair of side walls 121. A pair of screw holes 1212 are respectively recessed downwards from upper surfaces of rear sections of side walls 121.

The panel portion 2 is die-cast or a metallic plated body, and includes a secondary body portion 21 and a second mounting portion 22 extending rearwards from a back face of the secondary body portion 21. The secondary body portion 21 has a planar board member 213 and a pair of flange members 211, 212 formed on a bottom surface thereof laterally. The board member 213 defines a second depression portion 2130 on an upper section thereof and a vertical wall 2131 on a front section thereof Each flange member 211, 212 defines a pair of supporting post 2133 extruding downwards, the two pair of supporting posts 2133 are located at back end of the defines a first positioning hole 6221 in a middle section thereof The supporting post 2133 in the front end of the flange member 211 has a first aperture 2134 opening backwards, and the supporting post 2133 in the front end of the flange member 212 has a second aperture 2135, that is to say, the first aperture 2134 and the second aperture 2135 have opposite facing directions with each other. The board member 213 has a protrusion portion 2132 on a front end thereof The second mounting portion 22 also has a pair of side walls 221 and a lower wall 222 to corporately form a second semi-circular cavity 2201 and a deeper second position slot 2202 located in front of the second semi-circular cavity 2201. A pair of through holes 2211 are respectively defined in a rear section of the side walls 221.

Figure 1:
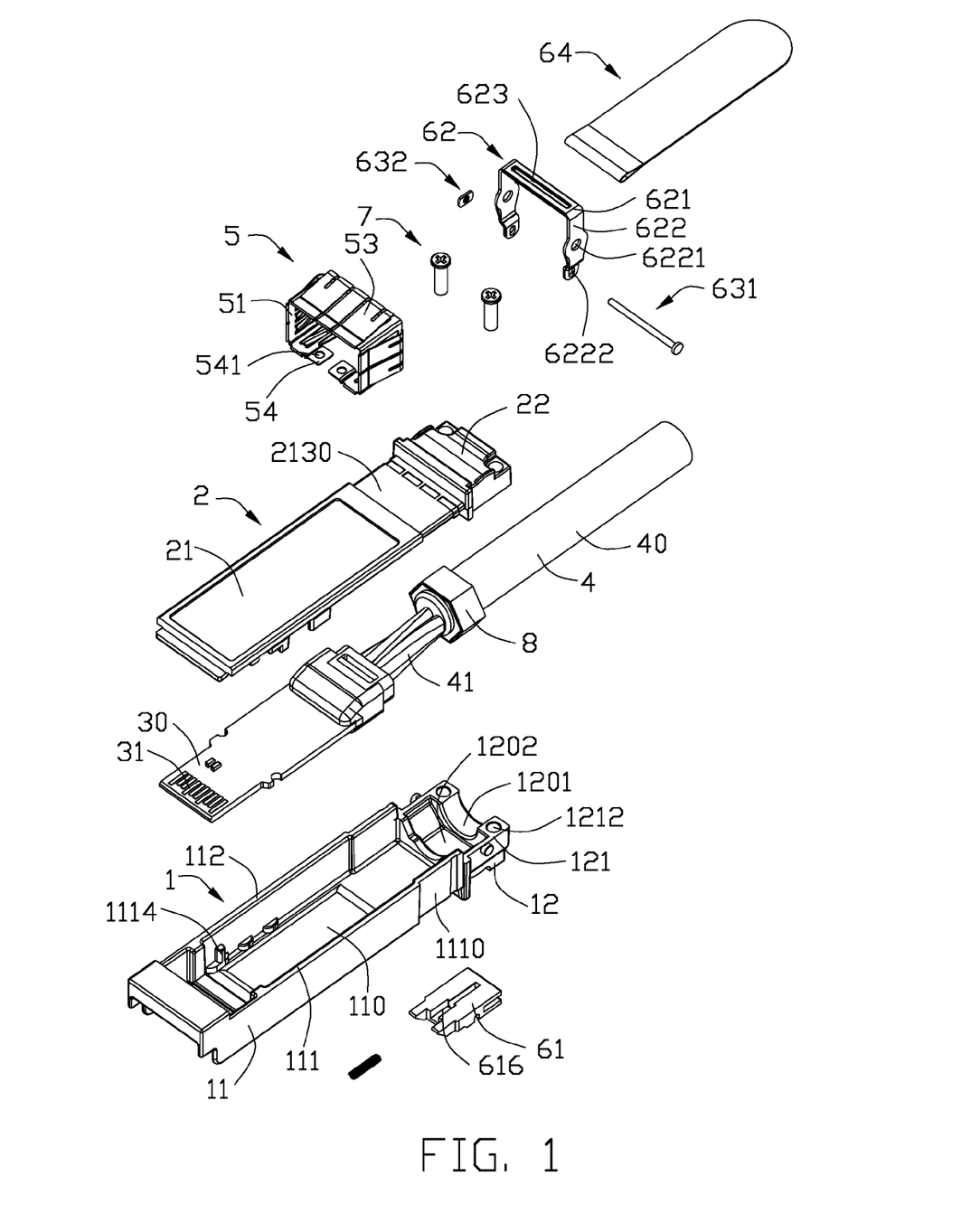
FIG. 1 is an exploded, perspective view of an electronic module in accordance with the present invention.
Figure 2:
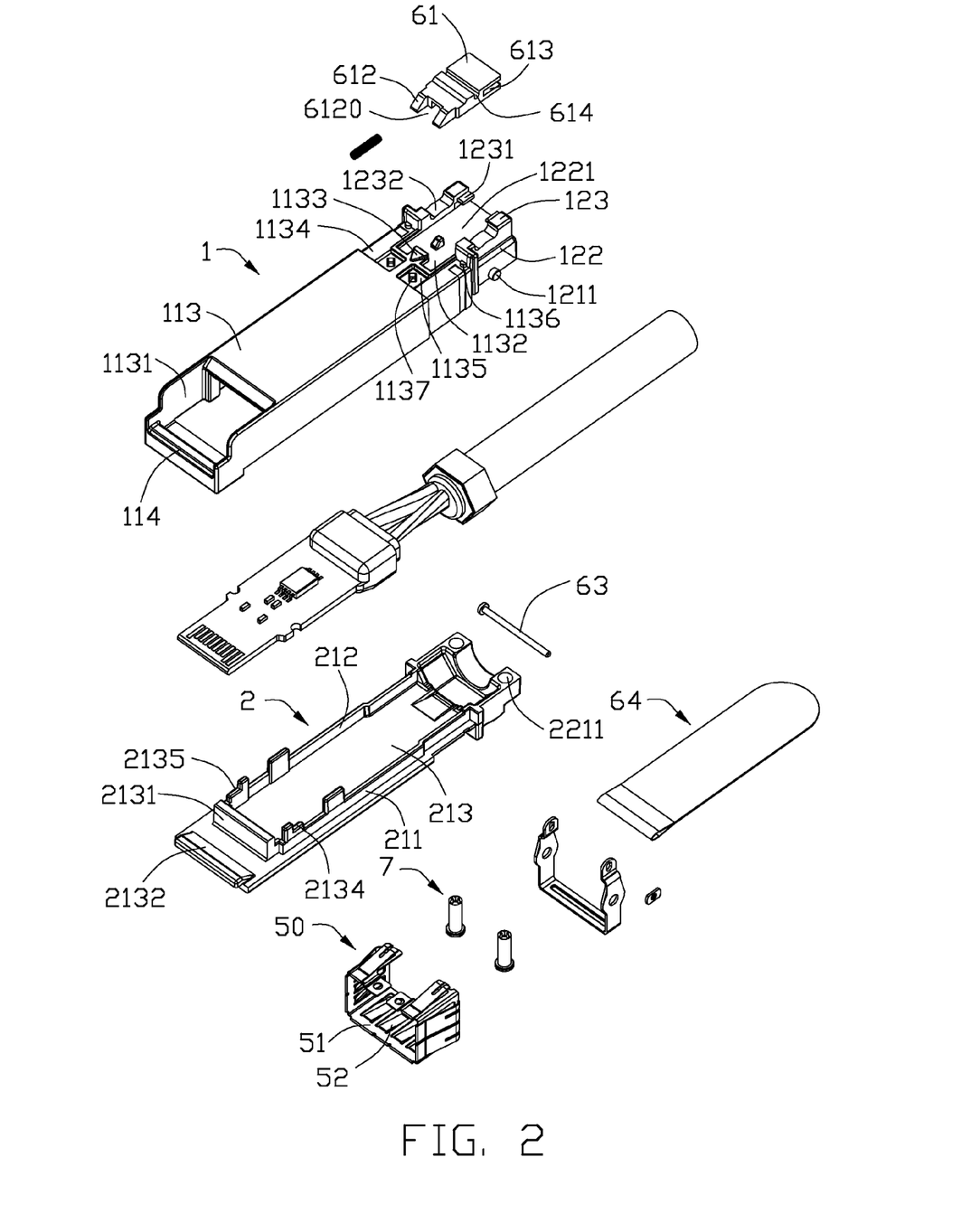
FIGS. 2-3 are another views similar to FIG. 1, but viewed from another aspects.
Figure 3:
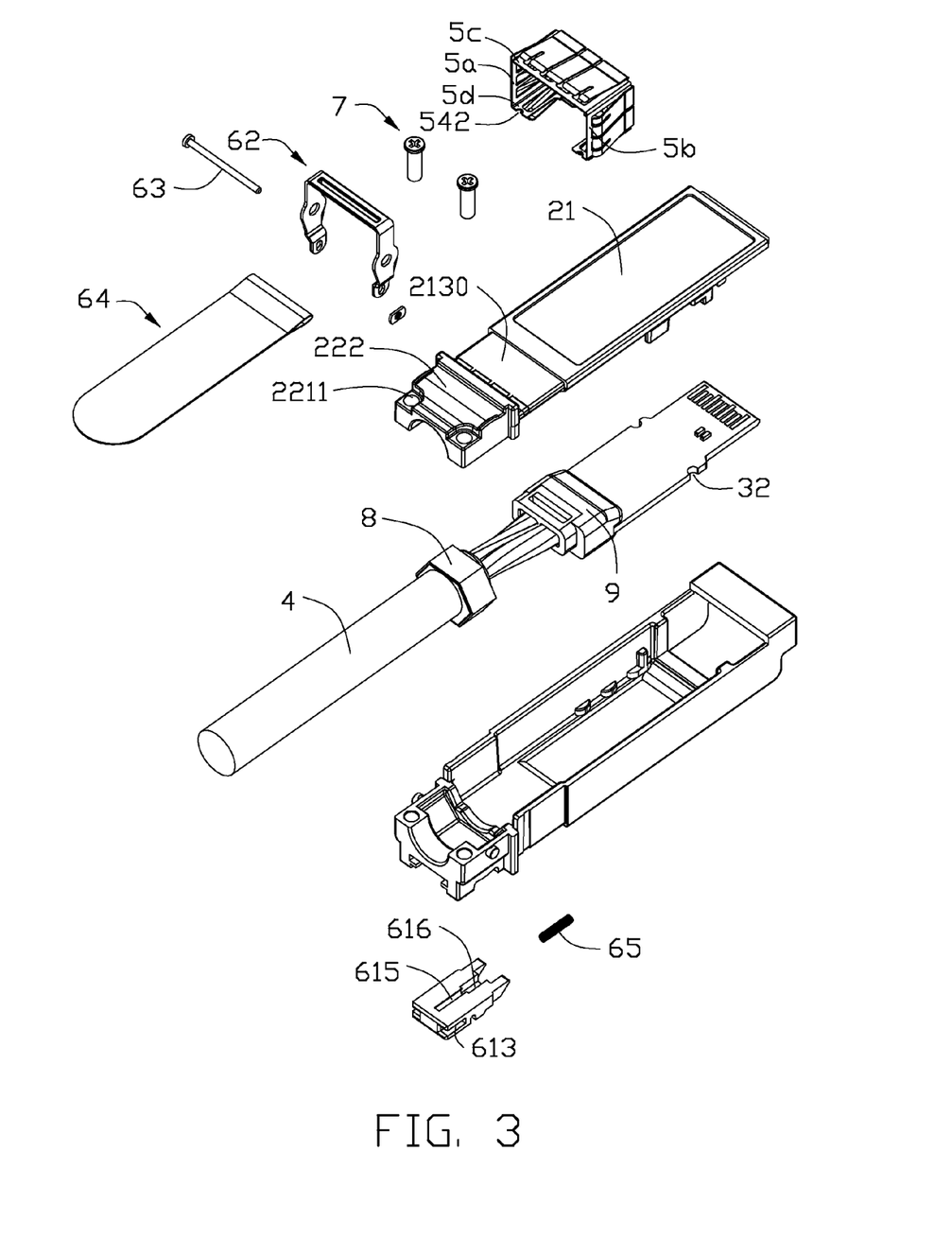
Figure 4:
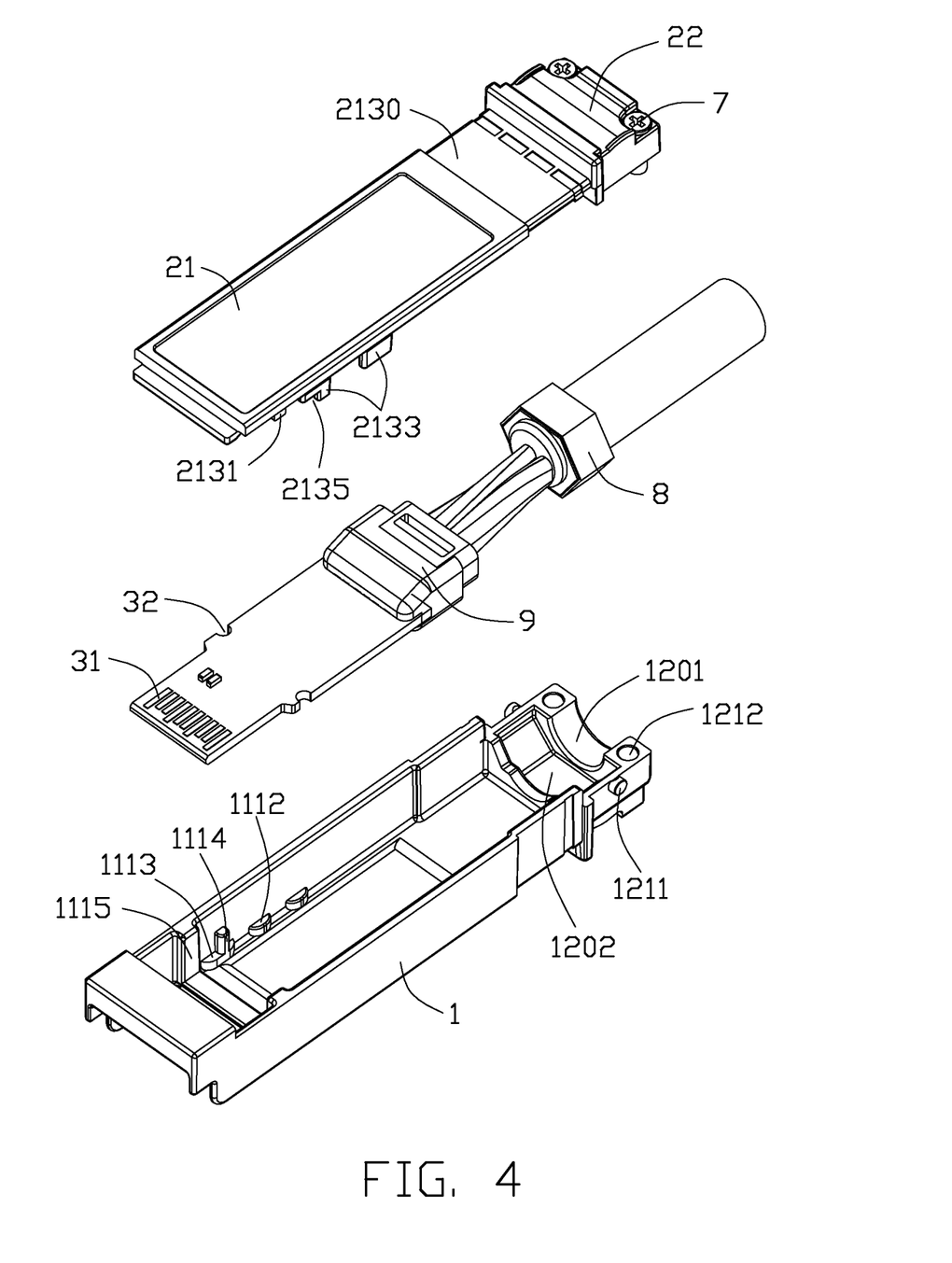
FIG. 4 is a partially assembled, perspective view of the electronic module shown in FIG. 1.
Figure 5:
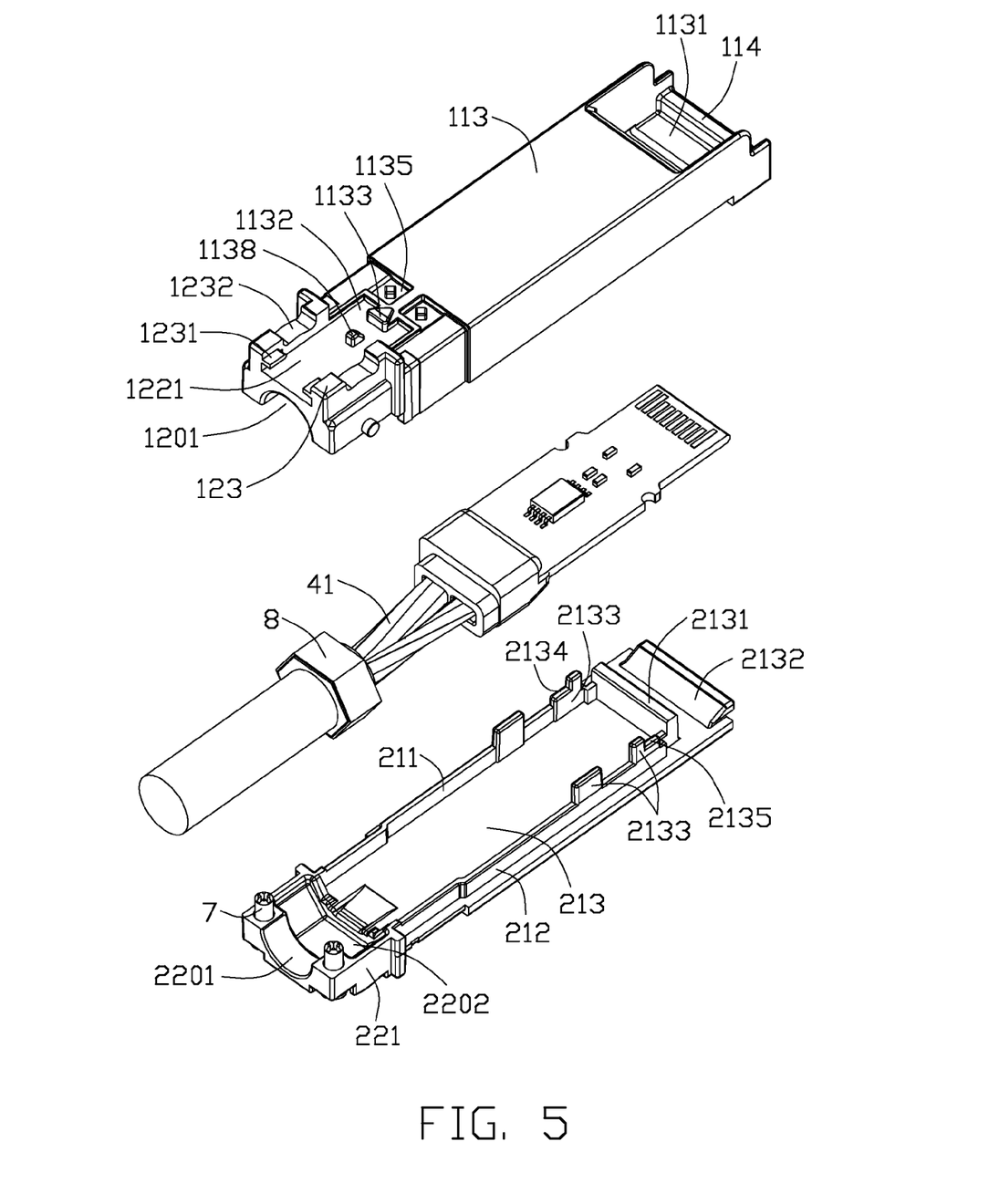
FIG. 5 is a view similar to FIG. 4, but viewed from another aspect.

The printed circuit board 3 includes a substrate 30, a plurality of first conductive pads 31 arranged on a front section of the substrate 30 and a plurality of second conductive pads (not shown) located on rear section thereof A pair of semi-circular positioning holes 32 are disposed in both sides of a front segment of the substrate 30, and the positioning holes 32 are not aligning with each other along a direction perpendicular to the mating direction, that is to say, the positioning holes 32 are stagger relative to each other along a transverse direction. The positioning holes 32 also can be defined with other configurations, such as square.

The cable 4 includes an outer insulative jacket 40, and a number of wires 41 enclosed in the insulative jacket 40 and insulated from each other. A cable holder member 8 is crimped to a front part of the cable 4, adjacent to exposed wires 41.

Referring to FIGS. 1-3, the gasket 5 is made of sheet metal and configured to rectangular-shaped frame portion 51, including a pair of vertical sides 5a, 5b, an upper side 5c joining upper edges of the pair of vertical sides 5a, 5b, and a pair of lower sub-walls 5d respectively extending inwardly from lower edges of the pair of vertical walls 5a, 5b. A lower outlet 50 is formed between the pair of lower sub-walls 5d for assembling easily. A number of detents 52, 53 are separated into a layer of first (outward) detents 53 and a layer of second (inward) detents 52 are formed on the frame portion 51. The layer of first detents 53 extend rearward and outward from front edge of the frame portion 51, while the layer of second detents 52 are stamped of the frame portion 51 and outward deflect the frame portion 51. The first detents 53 are shielding the second detents 52, therefore to achieve better Electro-Magnetic Interference (EMI) suppressing effect.

A pair of fixing portions 54 are formed on free ends of the pair of lower sub-walls 5d, and extending breadthwise into the lower outlet 50. Each fixing portion 54 has a circular hole 541 in a central area thereof Each sub-wall 5d has a semi-circular cutout 542 located in a distal end thereof to accommodate corresponding protrusion members 1136 in the sunken portions 1134.

The actuator mechanism includes a slider member 61, an actuator member 62, a fastening member 63, a pull tape 64 and an elastic member 65. The slider member 61 has a substantially rectangular shaped body portion 611 and two wedge-shaped arm portions 612 extending forward from a front face of the body portion 611. The two arm portions 612 are spaced from each other, with an opening 6120 formed therebetween. The body portion 611 has two grooves 613 respectively recessed inward from lateral surfaces of a rear segment thereof and a transverse through hole 614 in a middle section thereof, the transverse through hole 614 is adjacent to the grooves 613, the through hole 614 is facing downwards. The slider member 61 has a first groove 615 recessed downwards from an upper surface thereof and a second groove 616 communicated with the first groove 615, and the second groove 616 is wider than the first groove 615 along the transverse direction.

The actuator member 62 is configured to doorframe-shaped, and includes a doorhead 621 and two doorjambs 622. A slit 623 is formed in the doorhead 621 along the transverse direction. Each doorjamb 622 defines a first positioning hole 6221 in a middle section thereof, and a pair of mounting holes 6222 are defined through the lower ends of the doorjambs 622. The fastening member 63 is of rod-shaped, and includes a bolt member 631 and a nut 632.

The pull tape 64 is a soft belt with a certain width and comprises opposite ends, the opposite ends thereof are stuck to each other to form a handling portion 641 for being pulled by an operator to pull the actuator mechanism rearwardly. In the preferred embodiment, the elastic member 65 is a spring and assembled in the first groove 615.

Figure 6:
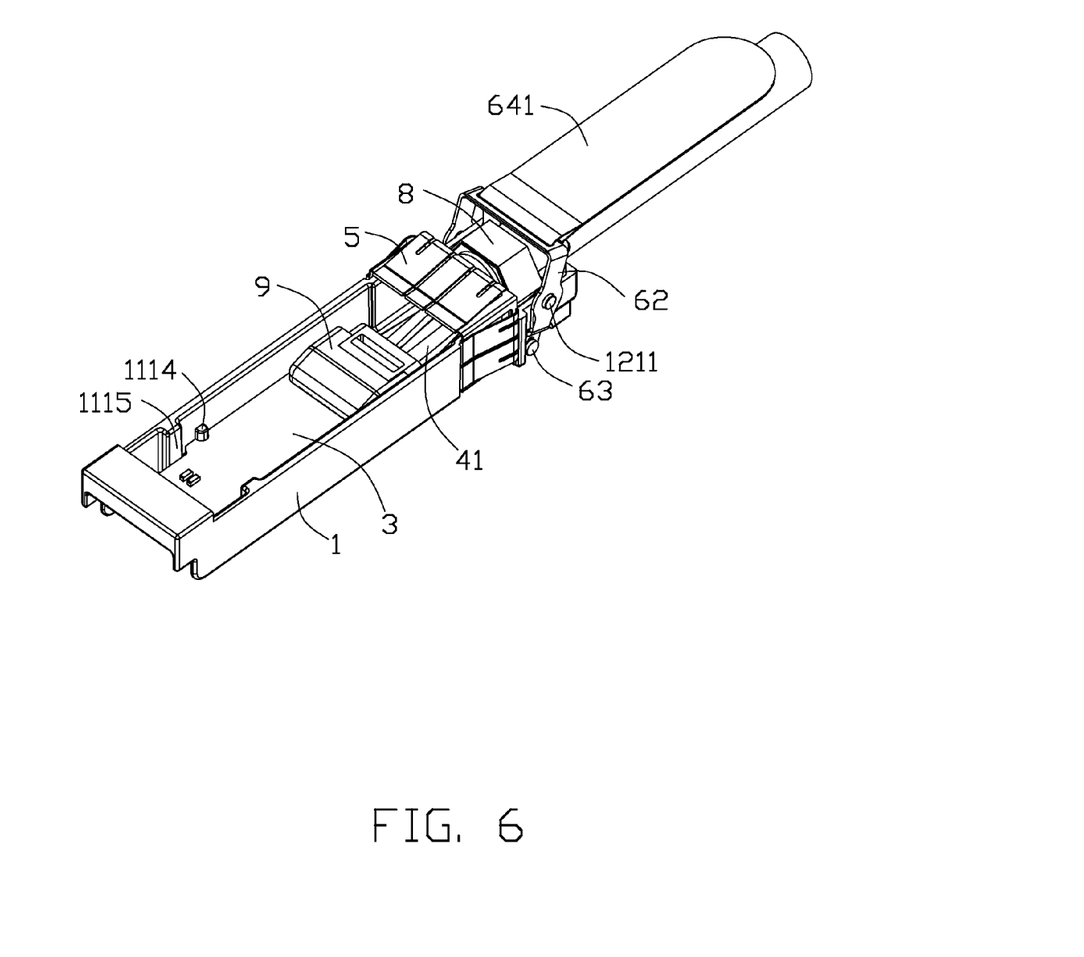
FIG. 6 is another assembled, perspective view of the electronic module shown in FIG. 1.
Figure 7:
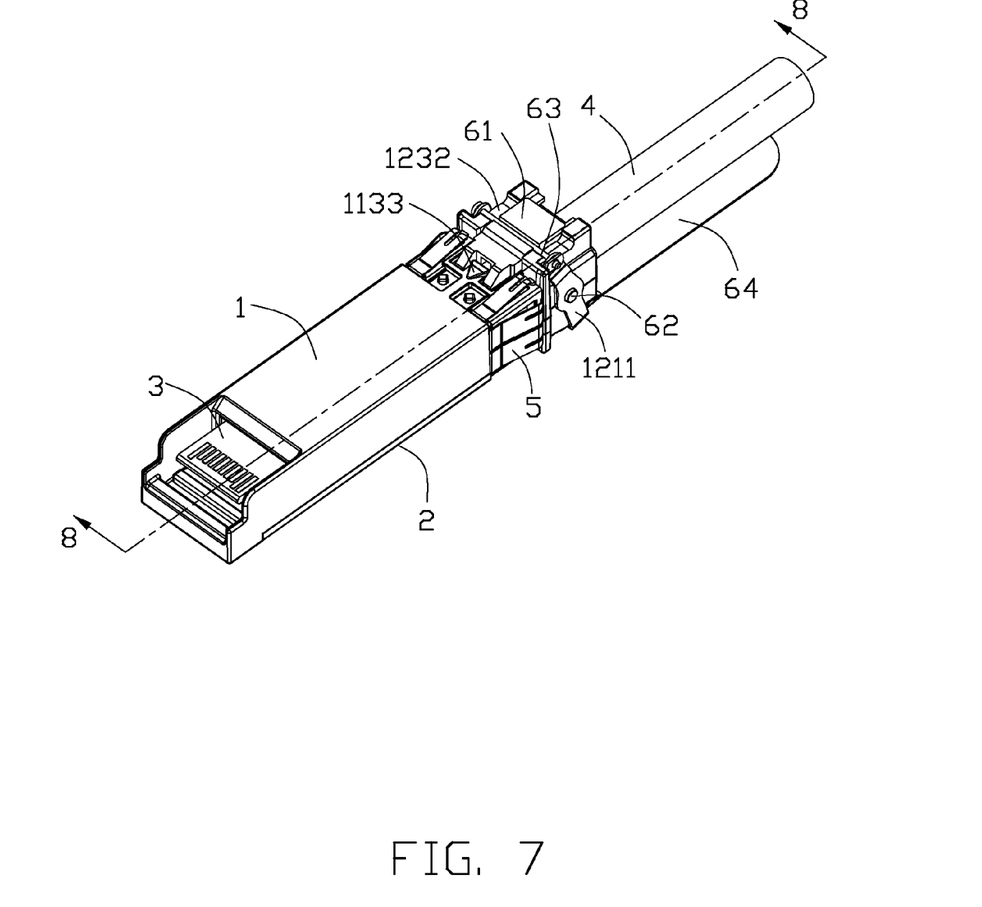
FIG. 7 is an assembled, perspective view of the electronic module shown in FIG. 2.
Figure 8:
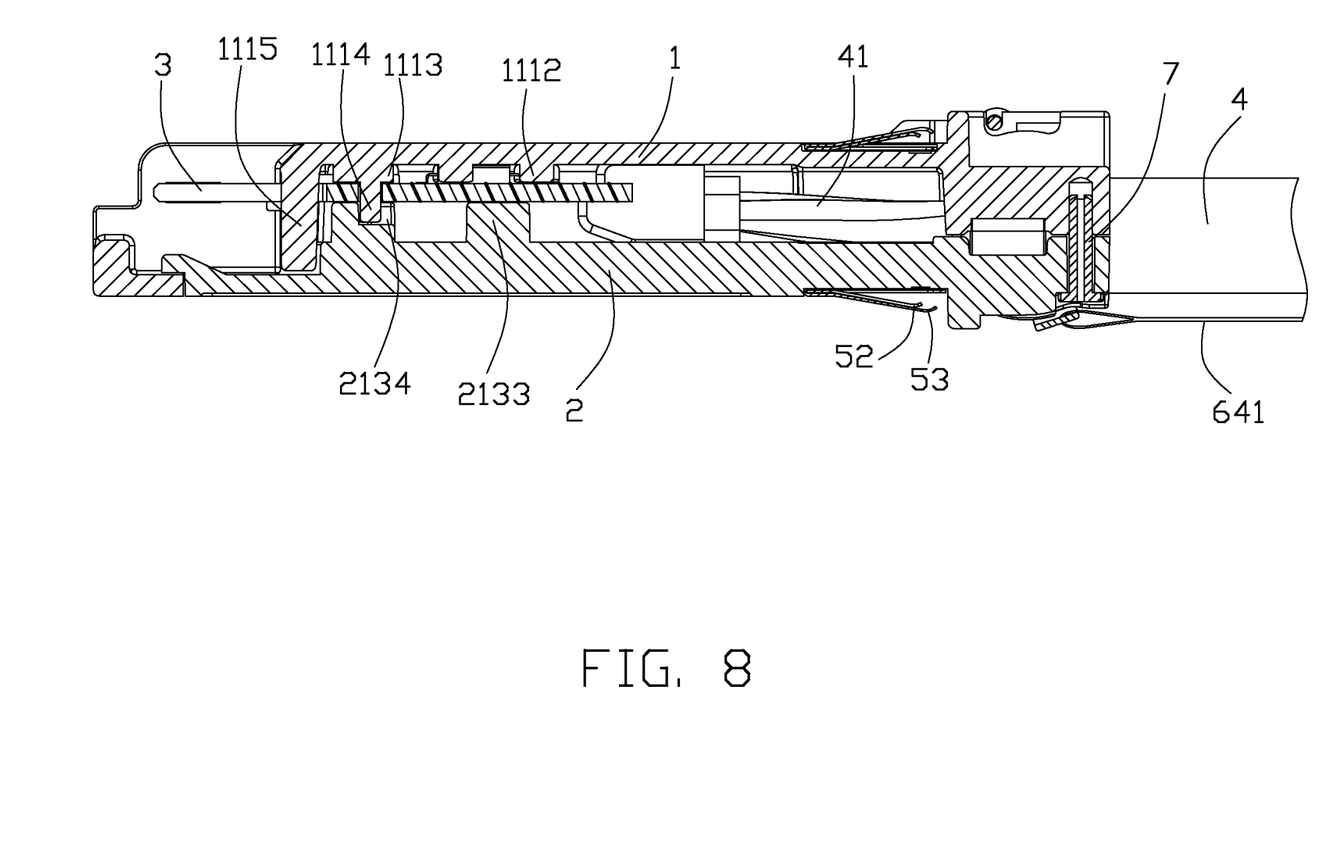
FIG. 8 is a cross-section view taken along line 8-8 of FIG. 7.

Referring to FIGS. 6-8, in conjunction with FIGS. 1-2, when assembly, the insulative jacket 40 of a front segment of the cable 4 is decorticated and then the wires 41 are exposed outside, then front section of the wires 41 are soldered to the second conductive pads of the printed circuit board 3, and an inner insulative cover 9 is over-molded on an electrical connection between the wires 41 and the printed circuit board 3.

The printed circuit board 3 is put into the base portion 1 and received in the receiving space 110 of the base portion 1, simultaneity, the printed circuit board 3 is disposed on the first standoffs 1112 and the second standoffs 1113 of the base portion 1, and the situating posts 1114 are inserted in to the positioning holes 32 of the printed circuit board 3 to fix the printed circuit board 3 to the base portion 1.

Partial of the cable holder member 8 is pressed into the first position slot 1202 of the base portion 1. The panel portion 2 is assembled to the base portion 1, with a pair of lateral flange members 211, 212 thereof inserted into the receiving space 110, the supporting posts 2133 are adjacent to a top surface of the printed circuit board 3. The situating posts 1114 of the base portion 1 are received in the first aperture 2134 and the second aperture 2135 of the panel portion 2, as the first aperture 2134 and the second aperture 2135 are opposite to each other, the situating posts 1114 can be prevented moving relative to the panel portion 2 along the mating direction. The protrusion portion 2132 is supported by the beam portion 114 of the base portion 1, the cable holder member 8 is partially received in the second second position slot 2202 of the panel portion 2. The pair of through holes 2211 of the panel portion 2 are aligning with a pair of screw holes 1212 of the base portion 1, then a pair of screw members 7 are inserted into the through holes 2211 and the screw holes 1212 to fasten the panel portion 2 and the base portion 1 together.

The gasket 5 is assembled to an outer surface of the housing, with the pair of vertical sides 5a, 5b thereof located in the pair of first depression portions 1110 of the base portion 1, the upper side 5c thereof located in the second depression portion 2130 of the panel portion 2, the pair of lower sub-walls 5d are located in the pair of sunken portions 1134, the fixing portions 54 are accommodated in the corresponding indentations 1135. The pair of tiny posts 1137 are inserted into the pair of through holes 541 of the pair of fixing portions 54 and then soldered therein. The protrusion members 1136 are received in the corresponding cutouts 542 of the lower sub-walls 5d.

The elastic member 65 is assembled in the first groove 615 of the slider member 61, then the slider member 61 is assembled to the second channel 1221 of the first mounting portion 12, the pair of thin bar members 1231 of the two guiding members 123 are received in the two grooves 613 of the slider member 61, the through hole 614 thereof are aligning with guiding passages 1232 of the two guiding members 123, the opening 6120 between the arm portions 612 is facing towards the tab 1133 in the first channel 1132, the extrusion 1138 is received in the second groove 616. Then, the actuator member 62 is assembled to the first mounting portion 12 of the base portion 12, and the pair of pivot members 1211 of the first mounting portion 12 are received in the pair of first positioning holes 6221 of the doorjambs 622 of the actuator member 62, the pair of mounting holes 6222 located in the end section of the doorjambs 622 are aligning with the through hole 614 of the slider member 61, then the bolt member 631 is inserted through the pair of mounting holes 6222 and the through holes 614 and slidable received in the guiding passage 1232, and the nut 632 is finally assembled to end of the bolt member 631. The pull tape 64 is inserted into the slit 623 of the actuator member 62, with the free ends stuck to each other to form the handling portion 641.

When the electronic module 100 mating with the complementary connector (not shown), the layer of first detents 53 contact with a cage (not shown) of the complementary connector to reduce EMI nearby an interface between a front segment of the complementary connector and rear portions of the primary body portion 11 of the base portion 1 and secondary body portion 21 of the panel portion 2, and the layer of second detents 52 may further prevent EMI leakage through slits between adjacent detents of the layer of first detents 53.

While the electronic module 100 disengaging away from the complementary connector, just exert a pulling force on the handling portion 641 of the pull tape 64 to promote the slider member 61 moving forwardly to reversely push the electronic module 100 moving backwards to depart from the complementary connector.

It is to be understood, however, that even though numerous characteristics and advantages of the present invention have been set forth in the foregoing description, together with details of the structure and function of the invention, the disclosure is illustrated only, and changes may be made in detail, especially in matters of shape, size, and arrangement of parts within the principles of the invention to the full extent indicated by the broad general meaning of the terms in which the appended claims are expressed.

What is claimed is:

1. An electronic module, comprising:
a base portion having a receiving space and a pair of lateral walls parallel to each other;
a panel portion defining a pair of flange members located inside of the corresponding lateral walls;
a printed circuit board disposed in the base portion; and an actuator mechanism assembled to the base portion; wherein the printed circuit board has a pair of positioning holes on lateral sides thereof, each of the positioning hole is of semicircular shape and faced towards outside, and the base portion defines a plurality of standoffs neighboring to the corresponding lateral walls, and at least one of the standoffs on a same side has a situating post thereon, the standoffs are adjacent to a bottom surface of the printed circuit board, with the situating posts inserted into the relative positioning holes, the panel portion has a plurality of supporting posts on the flange members to be adjacent to a top surface of the printed circuit board;
wherein the flange members are divided into a first flange member and a second flange member, and at least one of the supporting posts on the first flange member has a first aperture, at least one of the supporting posts on the second flange member has a second aperture, and the situating posts are received in the corresponding first and second aperture.

2. The electronic module as claimed in claim 1, wherein the first aperture and the second aperture have opposite facing directions with each other along a mating direction.

3. The electronic module as claimed in claim 1, wherein the positioning holes on the printed circuit board are asymmetric along a transverse direction.

4. The electronic module as claimed in claim 3, wherein the base portion has a primary body portion defining a beam portion with substantially L-shaped cross-section interconnecting free end portions of the pair of the lateral walls, the panel portion has a secondary body portion with a protrusion portion formed at forward end thereof and disposed on the beam portion.

5. The electronic module as claimed in claim 4, wherein rear segments of the pair of the lateral walls of the primary body portion define first depression portions, and a rear segment of the secondary body portion defines second depression portion.

6. The electronic module as claimed in claim 5, wherein the electronic module further has a gasket, the gasket includes a pair of vertical sides and an upper side joining upper edges of the pair of vertical sides, and the vertical sides are located in the pair of first depression portions of the base portion, the upper side is located in the second depression portion of the panel portion.

7. The electronic module as claimed in claim 4, wherein the base portion further includes first mounting portion rearward extending from back face of the primary body portion, and the panel portion further includes second mounting portion rearward extending from back face of the secondary body portion.

8. The electronic module as claimed in claim 7, wherein the first mounting portion defines a first semi-circular cavity, wherein the second mounting portion defines a second semi-circular cavity, and wherein a cable is inserted into the receiving space via the first and second cavities.

9. The electronic module as claimed in claim 8, wherein the first mounting portion defines a first position slot in a front portion of the first semi-circular cavity, wherein the second mounting portion defines a second position slot in front of the second semi-circular cavity, a cable holder member is disposed in the first position slot and the second position slot.

10. The electronic module as claimed in claim 1, wherein the actuator mechanism includes a slider member located in a channel of rear section of the base portion, an actuator member pivotally engaged with the base portion, a fastening member linkaged the slider member and the actuator member, and a pull tape assembled to the actuator member.

11. The electronic module as claimed in claim 10, further comprises a pair of guiding members respectively formed on a rear section of the base portion, laterally arranged the channel of the base portion.

12. The electronic module as claimed in claim 11, wherein each of guiding member has a bar member formed on a back section of the inward surface thereof and a lengthways guiding passage in front of the bar member.

13. The electronic module as claimed in claim 12, wherein the slider member includes a body portion having two grooves respectively recessed inward from lateral surfaces of a rear segment thereof and a transverse through hole in a middle section thereof, in front of the grooves.

14. The electronic module as claimed in claim 13, wherein the actuator member is configured to doorframe-shaped, including a doorhead with handle member formed thereon and two doorjambs having a pair of mounting holes defined through the lower ends thereof.

15. An electronic module comprising:
 a base portion including a pair of lateral walls;
 a pair of standoffs formed inside the pair of corresponding lateral walls, respectively;
 a panel portion assembled with the base portion and including a pair of flange members located inside the corresponding lateral walls, respectively, a pair of supporting posts formed on corresponding edges of the pair of flange members, respectively;
 a printed circuit board disposed in the base portion, said pair of standoffs and said pair of supporting posts respectively abutting against opposite surfaces of the printed circuit board; wherein said printed circuit board further includes a pair of notches in two opposite lateral edges, and a pair of situating posts each of which is formed on the corresponding one of the flange member and the lateral wall, and extends through the corresponding notch for positing the printed circuit board in position with regard to the combined base portion and panel portion;
 wherein the flange members are divided into a first flange member and a second flange member, and at least one of the supporting posts on the first flange member has a first aperture, at least one of the supporting posts on the second flange member has a second aperture, and the situating posts are received in the corresponding first and second aperture.

16. The electronic module as claimed in claim 15, wherein the pair of situating posts are both formed on the base portion inside of the corresponding lateral walls, respectively.

17. The electronic module as claimed in claim 16, wherein said situating posts are aligned with the pair of corresponding standoffs in a front-to-back direction.

18. The electronic module as claimed in claim 17, wherein the situating posts are joined with the corresponding standoffs in the front-to-back direction, respectively.

* * * * *